US011509506B2

(12) United States Patent
Liu et al.

(10) Patent No.: US 11,509,506 B2
(45) Date of Patent: Nov. 22, 2022

(54) FREQUENCY HOPPING ENHANCEMENTS FOR SRS TRANSMISSION

(71) Applicant: QUALCOMM Incorporated, San Diego, CA (US)

(72) Inventors: Le Liu, Fremont, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/952,487

(22) Filed: Nov. 19, 2020

(65) Prior Publication Data

US 2021/0194735 A1 Jun. 24, 2021

Related U.S. Application Data

(60) Provisional application No. 62/950,083, filed on Dec. 18, 2019.

(51) Int. Cl.
*H04L 25/02* (2006.01)
*H04L 5/00* (2006.01)
(Continued)

(52) U.S. Cl.
CPC ....... *H04L 25/0226* (2013.01); *H04B 1/7143* (2013.01); *H04B 7/0608* (2013.01); *H04L 5/0051* (2013.01); *H04L 27/2607* (2013.01)

(58) Field of Classification Search
CPC . H04B 1/7143; H04B 7/0608; H04L 27/2607; H04L 5/0051; H04L 25/0226
See application file for complete search history.

(56) References Cited

U.S. PATENT DOCUMENTS

2017/0310439 A1\* 10/2017 Yang ................. H04L 5/0053
2021/0075646 A1\* 3/2021 Yum ................. H04W 72/042
2021/0194737 A1\* 6/2021 Gao ................. H04L 5/0051

OTHER PUBLICATIONS

Ad-Hoc Chair (Samsung): "Chairman's Notes of AI 6.2.3 DL MIMO Efficiency Enhancements for LTE", 3GPP Draft, R1-1913376, 3GPP TSG RAN WG1 Meeting #99, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 25, 2019 (Nov. 25, 2019), XP051830657, 2 Pages, Retrieved from the Internet: URL:https://ftp.3gpp.org/tsg_ran/WG1_RL1/TSGR1_99/Docs/R1-1913376.zip, R1-1913376.doc [retrieved on Nov. 25, 2019] Second "Agreement" on p. 1.

(Continued)

*Primary Examiner* — Jackie Zuniga Abad
(74) *Attorney, Agent, or Firm* — Patterson & Sheridan, LLP

(57) ABSTRACT

Certain aspects of the present disclosure provide techniques for sounding reference signal (SRS) frequency hopping enhancements. An example method performed by user equipment generally includes determining a first sounding reference signal (SRS) frequency hopping pattern for transmitting one or more SRSs; determining an antenna switch will occur during the transmission of the one or more SRSs; determining a second SRS frequency hopping pattern for transmitting the one or more SRSs, wherein determining the second SRS frequency hopping pattern comprises using the first SRS frequency hopping pattern to generate the second SRS frequency hopping pattern based on the determined antenna switch; and transmitting a first set of SRSs of the one or more SRSs according to the first SRS frequency hopping pattern and transmitting a second set of SRSs of the one or more SRSs according to the second SRS frequency hopping pattern.

26 Claims, 7 Drawing Sheets

(51) Int. Cl.
*H04B 7/06* (2006.01)
*H04L 27/26* (2006.01)
*H04B 1/7143* (2011.01)

(56) References Cited

OTHER PUBLICATIONS

Huawei, et al., "Introduction of Additional SRS Symbols in Normal UL Subframe", 3GPP Draft, R1-1906069, 3GPP TSG RAN WG1 Meeting #97, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 4, 2019 (May 4, 2019), XP051708111,7 Pages, Retrieved from the Internet: URL:http://www.3gpp.org/ftp/tsg%5Fran/WG1%5FRL1/TSGR1%5F97/Docs/R1%2D1906069%2Ezip, [retrieved on May 4, 2019] Section 2.4 "Details of Repetition, Frequency Hopping and Antenna Switching for Additional SRS Symbols" pp. 4-6, Figures 3, 4.

International Search Report and Written Opinion—PCT/US2020/061630—ISA/EPO—dated Mar. 9, 2021

Qualcomm Incorporated: "Maintenance for Additional SRS Symbols", 3GPP Draft, R1-2000710, 3GPP TSG RAN WG1 Meeting #100, 3rd Generation Partnership Project (3GPP), Mobile Competence Centre, 650, Route Des Lucioles, F-06921 Sophia-Antipolis Cedex, France, vol. RAN WG1, No. e-Meeting, Feb. 24, 2020-Mar. 6, 2020, Feb. 15, 2020 (Feb. 15, 2020), XP051853402, 6 Pages, Retrieved from the Internet: URL:https://ftp.3gpp.org/tsg_ran/WG1_RL1/TSGR1_100_e/Docs/R1-2000710.zip, R1-2000710 Text_Proposal_LTE MIMO Remaining Issues_v3.docx [retrieved on Feb. 15, 2020] Section 1 "Introduction", pp. 1 and 2.

ZTE: "Discussion on Additional SRS Symbols", 3GPP Draft; R1-1911934, 3GPP TSG RAN WG1 Meeting #99, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019 (Nov. 9, 2019), XP051823115, pp. 1-3, Retrieved from the Internet: URL:https://ftp.3gpp.org/tsg_ran/WG1_RL1/TSGR1_99/Docs/R1-1911934.zip, R1-1911934 Discussion on additional SRS symbols. doc [retrieved on Nov. 9, 2019] Section 2.1 "SRS Frequency Hopping, Repetition and Antenna Switching", pp. 1-3, Figures 2.1, 2.2.

\* cited by examiner

FREQUENCY HOPPING ENHANCEMENTS FOR SRS TRANSMISSION

CROSS-REFERENCE TO RELATED APPLICATIONS

This application claims benefit of and priority to U.S. Provisional Application No. 62/950,083, filed Dec. 18, 2019, which is hereby assigned to the assignee hereof and hereby expressly incorporated by reference herein in its entireties as if fully set forth below and for all applicable purposes.

FIELD OF THE DISCLOSURE

Aspects of the present disclosure relate to wireless communications, and more particularly, to techniques for frequency hopping enhancements for sounding reference signal (SRS) transmission.

BACKGROUND

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method, performed by a user equipment (UE), for wireless communication. The method generally includes determining a first sounding reference signal (SRS) frequency hopping pattern for transmitting one or more SRSs; determining an antenna switch will occur during the transmission of the one or more SRSs; determining a second SRS frequency hopping pattern for transmitting the one or more SRSs, wherein determining the second SRS frequency hopping pattern comprises using the first SRS frequency hopping pattern to generate the second SRS frequency hopping pattern based on the determined antenna switch; and transmitting a first set of SRSs of the one or more SRSs according to the first SRS frequency hopping pattern and transmitting a second set of SRSs of the one or more SRSs according to the second SRS frequency hopping pattern.

Certain aspects provide an apparatus for wireless communications by a user equipment. The apparatus generally includes at least one processor configured to determine a first sounding reference signal (SRS) frequency hopping pattern for transmitting one or more SRSs; determine an antenna switch will occur during the transmission of the one or more SRSs; determine a second SRS frequency hopping pattern for transmitting the one or more SRSs, wherein determining the second SRS frequency hopping pattern comprises using the first SRS frequency hopping pattern to generate the second SRS frequency hopping pattern based on the determined antenna switch; and transmit a first set of SRSs of the one or more SRSs according to the first SRS frequency hopping pattern and transmitting a second set of SRSs of the one or more SRSs according to the second SRS frequency hopping pattern. The apparatus also generally includes a memory coupled with the at least one processor.

Certain aspects provide an apparatus for wireless communications by a user equipment in a network. The apparatus generally includes means for determining a first sounding reference signal (SRS) frequency hopping pattern for transmitting one or more SRSs; means for determining an antenna switch will occur during the transmission of the one or more SRSs; means for determining a second SRS frequency hopping pattern for transmitting the one or more SRSs, wherein determining the second SRS frequency hopping pattern comprises using the first SRS frequency hopping pattern to generate the second SRS frequency hopping pattern based on the determined antenna switch; and means for transmitting a first set of SRSs of the one or more SRSs according to the first SRS frequency hopping pattern and transmitting a second set of SRSs of the one or more SRSs according to the second SRS frequency hopping pattern.

Certain aspects provide a non-transitory computer-readable medium for wireless communications by a user equipment in a network. The non-transitory computer-readable medium generally includes instructions that, when executed by at least one processor, cause the at least one processor to determine a first sounding reference signal (SRS) frequency hopping pattern for transmitting one or more SRSs; determine an antenna switch will occur during the transmission of the one or more SRSs; determine a second SRS frequency hopping pattern for transmitting the one or more SRSs, wherein determining the second SRS frequency hopping pattern comprises using the first SRS frequency hopping pattern to generate the second SRS frequency hopping pattern based on the determined antenna switch; and transmit a first set of SRSs of the one or more SRSs according to the first SRS frequency hopping pattern and transmitting a second set of SRSs of the one or more SRSs according to the second SRS frequency hopping pattern.

Certain aspects provide a method for wireless communications by a base station (BS). The method generally includes receiving a first set of SRSs of one or more SRSs in a subframe according to a first SRS frequency hopping pattern and receiving a second set of SRSs of one or more SRSs in the subframe according to a second SRS frequency hopping pattern, wherein the second SRS frequency hopping pattern is generated from the first SRS frequency hopping pattern based on an antenna switch in the subframe.

Certain aspects provide an apparatus for wireless communications by a base station (BS). The apparatus generally includes at least one processor configured to receive a first set of SRSs of one or more SRSs in a subframe according to a first SRS frequency hopping pattern and receive a second set of SRSs of one or more SRSs in the subframe according to a second SRS frequency hopping pattern, wherein the second SRS frequency hopping pattern is generated from the first SRS frequency hopping pattern based on an antenna switch in the subframe. The apparatus also generally includes a memory coupled with the at least one processor.

Certain aspects provide an apparatus for wireless communications by a base station (BS). The apparatus generally includes means for receiving a first set of SRSs of one or more SRSs in a subframe according to a first SRS frequency hopping pattern and means for receiving a second set of SRSs of one or more SRSs in the subframe according to a second SRS frequency hopping pattern, wherein the second SRS frequency hopping pattern is generated from the first SRS frequency hopping pattern based on an antenna switch in the subframe.

Certain aspects provide a non-transitory computer-readable medium for wireless communications by a base station (BS). The non-transitory computer-readable medium generally includes instructions that, when executed by at least one processor, cause the at least one processor to receive a first set of SRSs of one or more SRSs in a subframe according to a first SRS frequency hopping pattern and receive a second set of SRSs of one or more SRSs in the subframe according to a second SRS frequency hopping pattern, wherein the second SRS frequency hopping pattern is generated from the first SRS frequency hopping pattern based on an antenna switch in the subframe.

Certain aspects of the present disclosure also provide various apparatus, means, and computer readable medium configured to perform (or cause a processor to perform) the operations described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for frequency hopping enhancements for sounding reference signal (SRS) transmission.

The following description provides examples of frequency hopping SRS transmission, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
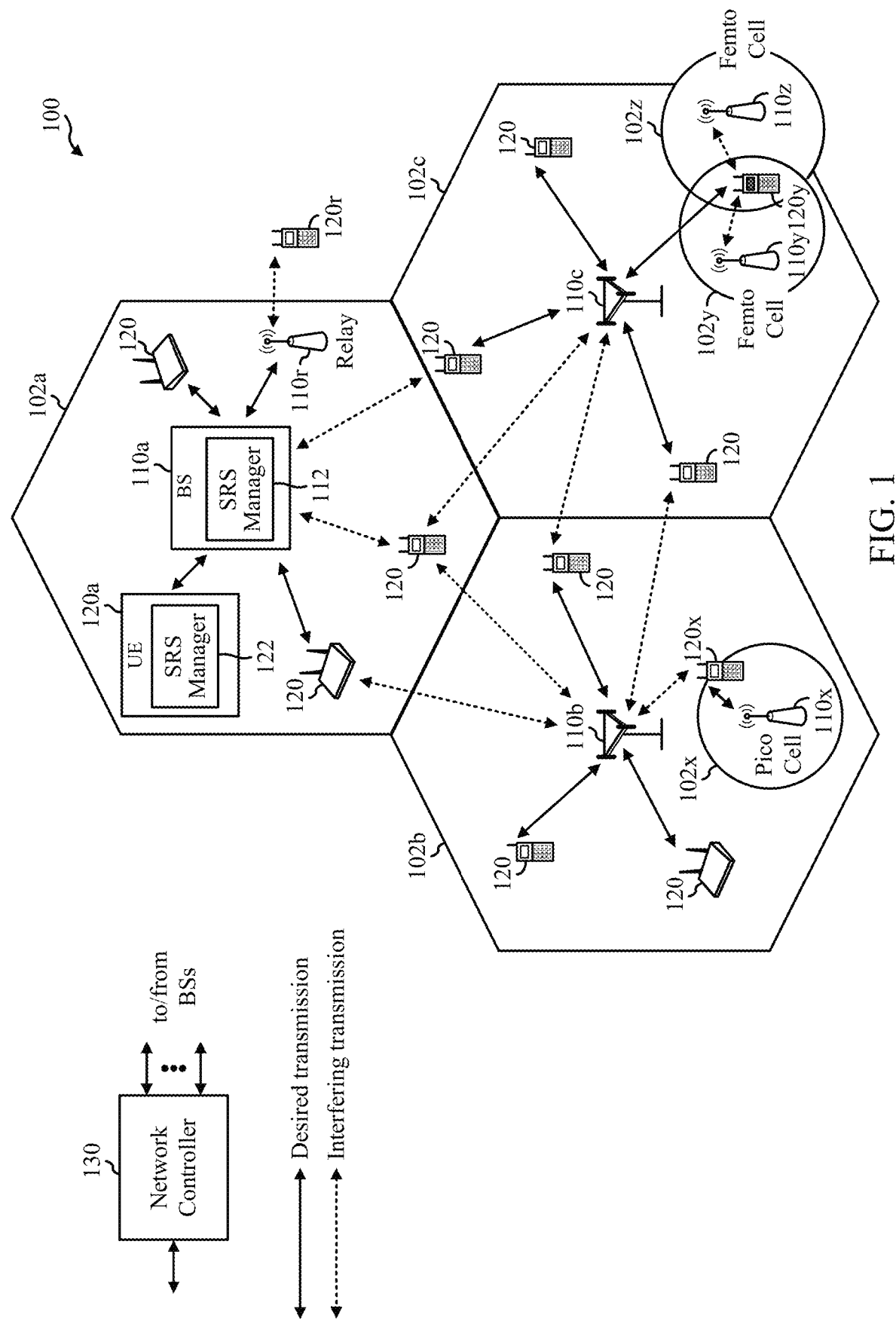
FIG. 1 is a block diagram conceptually illustrating an example telecommunications system, in accordance with certain aspects of the present disclosure.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the BSs 110 and UEs 120 may be configured for aperiodic SRS transmission on additional SRS symbol as described herein. As shown in FIG. 1, the BS 110a includes a sounding reference signal (SRS) module 112. The SRS manager 112 may be configured to perform the operations illustrated in one or more of FIGS. 4-7, as well as other operations disclosed herein for frequency hopping enhancements for SRS transmission, in accordance with aspects of the present disclosure. Additionally, as shown in FIG. 1, the UE 120a includes a SRS manager 122. The SRS manager 122 may be configured to perform the operations illustrated in one or more of FIGS. 3 and 5-7, as well as other operations disclosed herein for frequency hopping enhancements for SRS transmission, in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
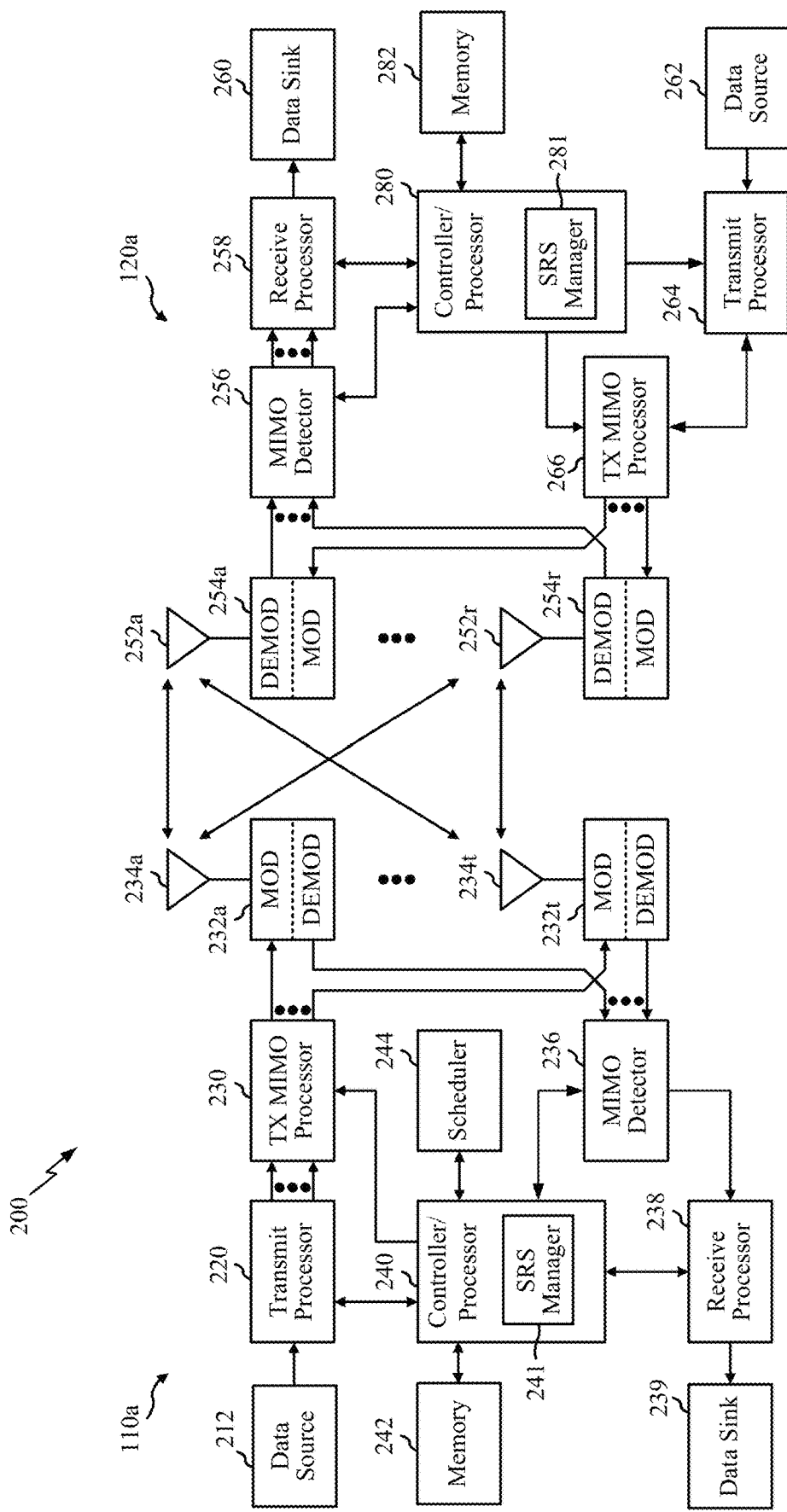
FIG. 2 is a block diagram conceptually illustrating a design of an example base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators in transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. For example, as shown in FIG. 2, the controller/processor 240 of the BS 110a includes an SRS manager 241 that may be configured to perform the operations illustrated in one or more of FIGS. 4-7, as well as other operations disclosed herein for frequency hopping enhancements for SRS transmission, according to aspects described herein. As shown in FIG. 2, the controller/processor 280 of the UE 120a includes SRS manager 281 that may be configured to perform the operations illustrated in one or more of FIGS. 3 and 5-7, as well as other operations disclosed herein for frequency hopping enhancements for SRS transmission, according to aspects described herein. Although shown at the Controller/Processor, other components of the UE 120a and BS 110a may be used performing the operations described herein.

Example A—SRS Transmission and Rate Matching

In wireless communication systems, such as the wireless communication network 100 described above, user equipments (UEs) may transmit sounding reference signals (SRSs) so that the network/base station (e.g., eNBs, gNB, etc.) can measure uplink channel quality. Conventionally, one SRS is transmitted by the UE in a last symbol of a normal uplink subframe. However, more recently, additional symbols have been introduced for transmitting SRSs in a normal uplink (UL) subframe. These additional SRS symbols may be identified based on a flexible SRS symbol location configuration and/or a virtual cell ID associated with the UE that transmitted the (additional) SRSs. In this context, a "normal subframe" is contrasted with a "special subframe" such as those defined as a mixed DL/UL subframe with three fields including a downlink pilot time slot (DwPTS) field, guard period (GP) field, and an uplink pilot time slot (UpPTS) field. Further, "special subframes" may be placed between "normal DL subframes" and "normal UL subframes" and may allow a UE to switch between receive and transmit processing in TDD system.

In some cases, SRS capacity and coverage enhancements may be supported by introducing more than one symbol for SRS in an UL normal subframe. For example, this may involve introducing more than one symbol for SRS for one UE or for multiple UEs in the UL normal subframe. As a baseline, a minimum SRS resource allocation granularity for a cell may be one slot (e.g., one of two time slots of a subframe) or a subframe, for example, when more than one symbol in a normal subframe is allocated for SRS for the cell. As noted above, a virtual cell ID may be introduced for SRS, allowing different SRS transmissions to be distinguished.

Additionally, in some cases, intra-subframe frequency hopping (FH) and repetition may be supported for aperiodic SRS in the additional SRS symbols of a normal uplink subframe. Intra-subframe frequency hopping for aperiodic SRS transmission may involve transmitting aperiodic SRSs on different frequency bands on a symbol-by-symbol basis in a subframe. Additionally, aperiodic SRS repetition may involve repeating transmission of an aperiodic SRS. For example, aperiodic SRS transmission may involve repeating transmission of an aperiodic SRS, transmitted in a first additional symbol of a subframe (e.g., using a first antenna, frequency band, etc.), in a second additional symbol of the subframe.

Further, intra-subframe antenna switching (AS) may be supported for aperiodic SRS in the additional SRS symbols. Intra-subframe antenna switching for aperiodic SRS transmission may involve transmitting aperiodic SRSs using different antennas on a symbol-by-symbol basis in a subframe. For example, in some case, 1T2R, 1T4R, and 2T4R antenna switching may be supported, where T represents the number of transmit antennas and R represents the number of receive antennas, allowing a UE with R antennas greater than T SRS tx antenna ports (e.g., R>T) to switch (R/T) antennas or antenna pairs on each SRS transmit instance/opportunity.

In some cases, intra-subframe frequency hopping/repetition and intra-subframe antenna switching may be concurrently configured. In this case, frequency hopping may be performed before antenna switching. In certain cases, there may be a restriction on the number of antenna switches and frequency hops that may occur in a single subframe. For example, in some cases, the number of antenna switches may be limited to two for 1T2R or when the number of antenna pairs is configured as two for 2T4R (e.g., antenna pairs {0, 1} and {2, 3}). Additionally, in some cases, the number of antenna switches may be limited to three if the number of antenna pairs is configured as three for 2T4R (e.g., antenna pairs {0, 1}, {0, 2} and {0, 3}). Additionally, in some cases, the number of antenna switches may be limited to four for 1T4R.

For intra-subframe frequency hopping, the number of frequency hops, $N_{FH}$ (e.g., an integer value), for additional SRS may be determined according to $N=RN_{FH}+(N_{FH}-1)G_{FH}$ if antenna switching is not configured for additional SRS, and according to equation one if antenna switching is configured for additional SRS:

$$N=R*N_{AS}*N_{FH}+(N_{AS}-1)*G_{AS}+(N_{FH}-1)*G_{FH}, \qquad \text{(eq. 1)}$$

where N is a total duration in terms of OFDM symbols for transmission of the additional SRS symbols given by the higher-layer parameter additionalSRS-duration, R is a repetition factor associated with the transmission of the additional SRS symbols given by higher-layer parameter additionaSRS-RepNum, $N_{AS}$ is a number of antenna switches associated with the transmission of the additional SRS symbols, $N_{FH}$ is a number of frequency hops associated with transmission of the additional SRS symbols, $G_{AS}$ is a guard symbol configuration value for antenna switching given by the higher-layer parameter additionalSRS-GuardSymbolAS, and $G_{FH}$ is a guard symbol configuration value for frequency hopping given by the higher-layer parameter additionalSRS-GuardSymbolFH. In some cases, $G_{FH} \in \{0, 1\}$ and $G_{AS} \in \{0, 1\}$. In some cases, if a UE is configured by the higher layer parameter additionalSRS-GuardSymbolFH a guard symbol may be added between every frequency hop.

If a full set of subbands is used for SRS frequency hopping on additional SRS symbols within a subframe, it may be straightforward that the same group of subband indices are used per antenna. However, if only a subset of subbands is used for SRS frequency hopping on additional SRS symbols within a subframe, $N_{FH}$ may be counted as the number of frequency hops on same antenna index while keeping the same group of subband indices to be used per antenna. Otherwise the part "$R*N_{AS}*N_{FH}$" in the equation one may not be correct no matter if $G_{FH}=0$ or 1 and $G_{AS}=0$ or 1. For example, there are 8 subbands in total within SRS bandwidth configured for additional SRS. If no antenna switching is enabled, $N_{FH}=6$ subbands can be sounded on N=6 additional SRS symbols (e.g., N=6, R=1, $G_{FH}=0$, $G_{AS}=0$, $N_{FH}=6$) with a subset of subbands $\{0, 1, 2, 3, 4, 5\}$ on additional SRS symbols. However, if SRS 1T2R is enabled, only $N_{FH}=3$ subbands can be sounded on N=6 additional SRS symbols (e.g., N=6, R=1, $G_{FH}=0$, $G_{AS}=0$, $N_{AS}=2$, $N_{FH}=3$) with a subset of subbands $\{0, 1, 2\}$ per antenna over N=6 SRS symbols.

In other aspects, in the cases of when $G_{FH}=1$ and $G_{AS}=0$ or 1, the part "$(N_{FH}-1)*G_{FH}$" in equation one above may not be correct, as explained below. Additionally, in the case of $G_{FH}=1$ and $G_{AS}=0$, if a frequency hopping pattern (e.g., a subband order) is repeated after switching antenna, and additional gap symbol may be required since the last subband index of previous antenna is different from the starting subband index. Since $G_{AS}=0$, the part of "$(N_{AS}-1)*G_{AS}$" in equation one above is equal to 0, which does not count the above additional gap symbol between antenna switches if the frequency hopping pattern is repeated per antenna. For example, assuming that the subband order for additional SRS transmission is subband 0→subband 1→subband 2, if this subband order is repeated after an antenna switch, an additional symbol gap may be required since the UE may need to switch from subband 2 to subband 0.

Thus, aspects of the present disclosure provide techniques for correcting the above issues described above when transmitting SRSs using intra-subframe frequency hopping, repetition, and/or antenna switching. For example, if SRS antenna switching and frequency hopping are both enabled, some aspects include techniques for setting a same group of subband indices to be used per antenna index. Additionally, some aspects include techniques for determining the number of frequency hops ($N_{FH}$) (e.g., when $G_{FH}=1$ and $G_{AS}=0$ or 1) as well as helping to alleviate the need for an additional gap symbol when switching antennas. For example, in some cases, techniques presented herein involve modifying a first SRS frequency hopping pattern used for transmitting a first set of SRSs in response to a determination that an antenna switch will occur. The modified hopping pattern may alleviate the need for the additional gap symbol, as explained below.

Figure 3:
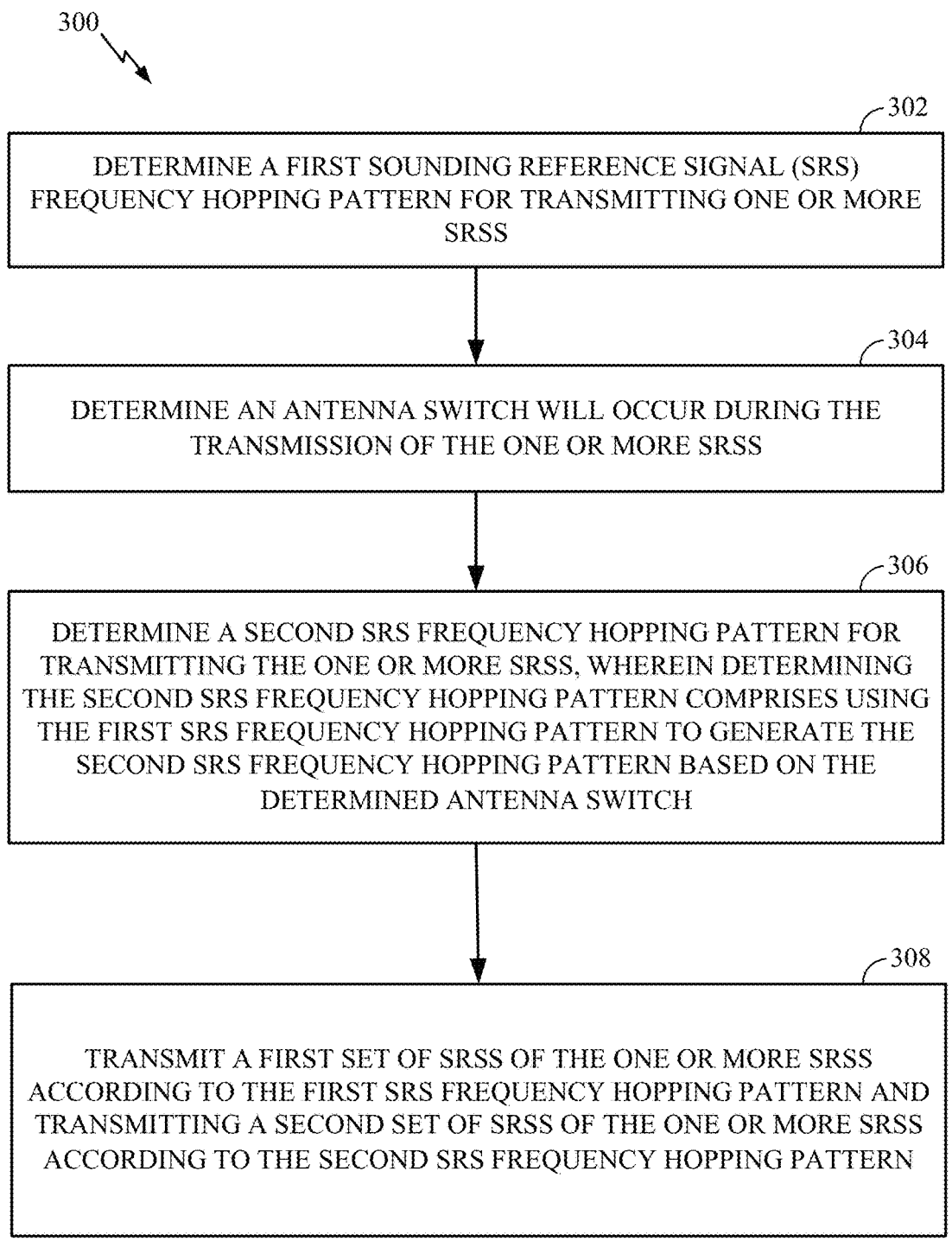
FIG. 3 illustrates example operations for wireless communications by a user equipment, in accordance with certain aspects of the present disclosure.

FIG. 3 illustrates example operations 300 for wireless communications in a network in a network, for example, for transmitting sounding reference signals (SRSs) to the network. The operations 300 may be performed, for example, by UE (e.g., such as a UE 120a in the wireless communication network 100). The operations 300 may be implemented as software components that are executed and run on one or more processors (e.g., controller/processor 280 of FIG. 2). Further, the transmission and reception of signals by the apparatus in operations 300 may be enabled, for example, by one or more antennas (e.g., antennas 252 of FIG. 2). In certain aspects, the transmission and/or reception of signals by the apparatus may be implemented via a bus interface of one or more processors (e.g., controller/processor 280) obtaining and/or outputting signals.

The operations 300 may begin at 302 by determining a first sounding reference signal (SRS) frequency hopping pattern for transmitting one or more SRSs.

At 304, the UE determines an antenna switch will occur during the transmission of the one or more SRSs.

At 306, the UE determines a second SRS frequency hopping pattern for transmitting the one or more SRSs, wherein determining the second SRS frequency hopping pattern comprises using the first SRS frequency hopping pattern to generate the second SRS frequency hopping pattern based on the determined antenna switch.

At 308, the UE transmits a first set of SRSs of the one or more SRSs according to the first SRS frequency hopping pattern and transmitting a second set of SRSs of the one or more SRSs according to the second SRS frequency hopping pattern.

Figure 4:
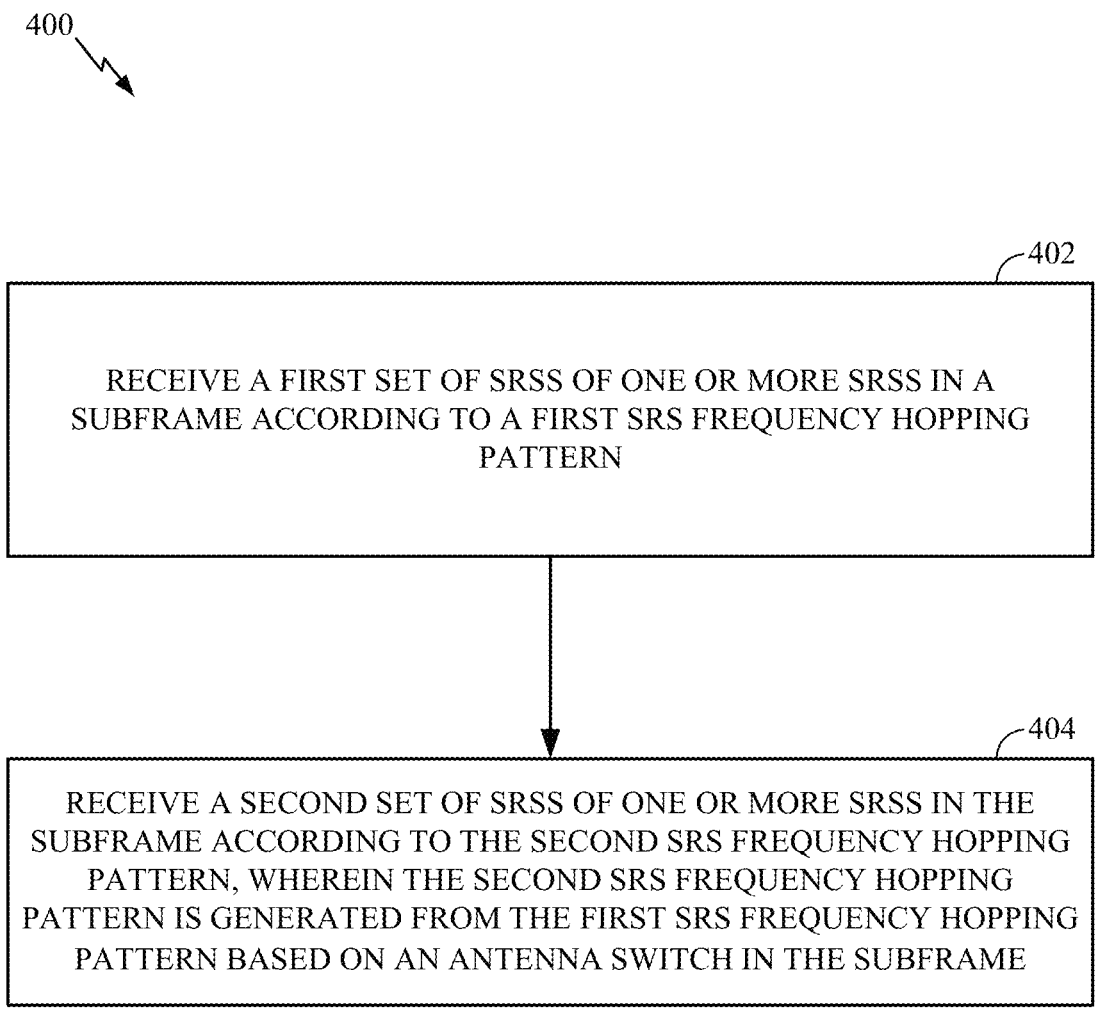
FIG. 4 illustrates example operations for wireless communications by a network entity, in accordance with certain aspects of the present disclosure.

FIG. 4 illustrates example operations 400 for wireless communications in a network, for example, for receiving SRSs. The operations 400 may be performed, for example, by a network entity, such as a BS (e.g., BS 110a in the wireless communication network 100). Operations 400 may be implemented as software components that are executed and run on one or more processors (e.g., controller/processor 240 of FIG. 2). Further, the transmission and reception of signals by the BS in operations 400 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 400 may begin, at 402, by receiving a first set of SRSs of one or more SRSs in a subframe according to a first SRS frequency hopping pattern.

At 404, the network entity receives a second set of SRSs of one or more SRSs in the subframe according to a second SRS frequency hopping pattern, wherein the second SRS frequency hopping pattern is generated from the first SRS frequency hopping pattern based on an antenna switch in the subframe.

As noted above, aspects of the present disclosure provide techniques for helping correct issues with determining the number of frequency hops for transmitting additional SRS and reducing symbol gaps when intra-subframe frequency hopping and intra-subframe antenna switching are configured/activated.

For example, as noted above, Equation 1 above for determining the number of frequency hops may not be correct. For example, if SRS antenna switching and frequency hopping are both enabled on additional SRS symbols, the parameter {$n_{SRS}=0, \ldots N_{FH}-1$} may used to calculate subband index for first antenna index, where $n_{SRS}=\lfloor(l-l0)/R\rfloor$, l is the index of the OFDM symbol number carrying additional SRS within the subframe not counting guard symbol(s), and l0 is starting OFDM symbol within the subframe is given by the higher-layer parameter additionalSRS-startPos. For the subband index on other antenna index, the same group of subband indices as the first antenna index may be used instead of using $n_{SRS}>N_{FH}$ to calculate the subband index.

Additionally, when $G_{FH}=1$ and $G_{AS}=0$ or 1, to fix the issue of counting the gap symbols for possible frequency hops and/or antenna switches in Equation 1 with the determination of the number of frequency hops, aspects of the present disclosure provide techniques for repeating an SRS frequency subband order of a previous antenna when switching to a different antenna and adding a gap symbol per antenna switch in the case of $G_{FH}=1$ and $G_{AS}=0$.

For example, in some cases, the UE may determine a first SRS frequency hopping pattern for transmitting one or more SRSs. According to aspects, the first SRS frequency hopping pattern may include an order of subbands for transmitting a first set of SRSs of the one or more SRSs. The UE may also determine that an antenna switch will occur during the transmission of the one or more SRSs. In response to the determined antenna switch, the UE may determine a second SRS frequency hopping pattern for transmitting the one or more SRSs using (e.g., based on) the first SRS frequency hopping pattern. According to aspects, the second SRS frequency hopping pattern may include an order of subbands for transmitting a second set of SRSs of the one or more SRSs. In some cases, the first set of SRSs may be transmitted using a first antenna while the second set of SRSs may be transmitted using a second antenna different from the first antenna used for transmitting the first set of SRSs (e.g., based on the determined antenna switch).

In some cases, determining the first SRS frequency hopping pattern and the second SRS frequency hopping pattern may be based on a gap symbol configuration for transmitting the one or more SRSs. For example, in some cases, the gap symbol configuration may comprise $G_{FH}=1$ and $G_{AS}=0$.

In some cases, using the first SRS frequency hopping pattern to generate the second SRS frequency hopping pattern may comprise repeating the order of subbands used for transmitting a first set of SRSs on the first antenna. In other words, the subband order of the second set of SRSs may be the same as the subband order of the first set of SRSs. Additionally, since repeating the same subband order for both the first antenna and the second antenna will result in a frequency change between a last SRS of the first set of SRSs and a first SRS of the second set of SRSs, a gap symbol may be included between the last SRS of the first set of SRSs and a first SRS of the second set of SRSs. Accordingly, after receiving the first set of SRSs according to an order of subbands, the BS may receive the second set of SRSs according to the same order of subbands as the first SRS frequency hopping pattern.

According to aspects, to achieve this subband repetition and gap symbol between the first set of SRSs and the second set of SRSs, the UE may determine the first SRS frequency hopping pattern and the second frequency hopping pattern according to equation two:

$$N=RN_{AS}N_{FH}+(N_{AS}-1)G_{AS}+(N_{FH}-1)N_{AS}G_{FH}+(N_{AS}-1)(1-G_{AS})G_{FH}, \quad \text{(eq. 2)}$$

where N is a total duration in terms of OFDM symbols for transmission of the additional SRS symbols given by the higher-layer parameter additionalSRS-duration, R is a repetition factor associated with the transmission of the additional SRS symbols given by higher-layer parameter additionaSRS-RepNum, $N_{AS}$ is a number of antenna switches associated with the transmission of the additional SRS symbols, $N_{FH}$ is a number of frequency hops with the same antenna/antenna pair associated with transmission of the additional SRS symbols, $G_{AS} \in \{0, 1\}$ is a guard symbol configuration value for antenna switching given by the higher-layer parameter additionalSRS-GuardSymbolAS, and $G_{FH} \in \{0, 1\}$ is a guard symbol configuration value for frequency hopping given by the higher-layer parameter additionalSRS-GuardSymbolFH.

Figure 5:
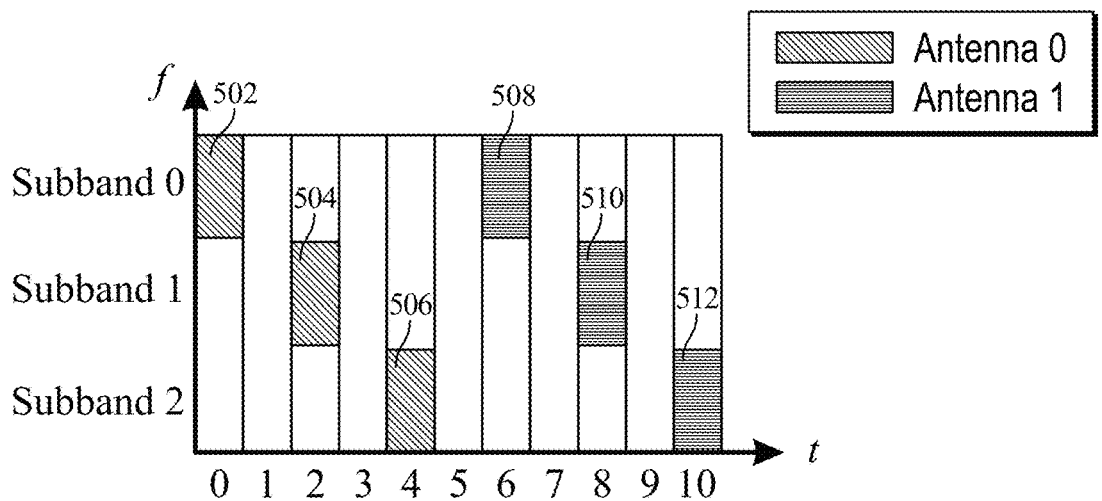
FIG. 5 illustrates repeating a subband order for transmitting one or more SRSs, in accordance with certain aspects of the present disclosure.

FIG. 5 illustrates repeating a subband order for transmitting one or more SRSs, according to certain aspects. For example, as illustrated, the UE may transmit a first set of SRSs of one or more SRSs according to a first SRS frequency hopping pattern using a first antenna (e.g., antenna 0). As shown the first SRS frequency hopping pattern may include a subband order for transmitting the first set of SRSs, which includes, for example, transmitting a first SRS 502 on subband 0 in symbol 0, transmitting a second SRS 504 on subband 1 in symbol 2, and transmitting a third SRS 506 on subband 2 in symbol 4. As shown, since the UE changes subbands between SRS transmissions of the first set of SRSs, a gap symbol may be configured between each SRS transmission (e.g., in symbols 1 and 3) to accommodate an antenna switch. After transmitting the first set of SRSs, the UE may switch to antenna 1 and transmit a second set of SRSs of the one or more SRSs.

As illustrated, the second set of SRSs may be transmitted according to a second SRS frequency hopping pattern, which may include repeating the subband order of the first set of SRSs. For example, as illustrated, a first subband (e.g., subband 0) of the second SRS frequency hopping pattern used for transmitting the second set of SRSs is the same as a first subband (e.g., subband 0) of the first frequency hopping pattern used for transmitting the first set of SRSs. Similarly, as illustrated, a last subband (e.g., subband 2) of the second SRS frequency hopping pattern used for transmitting the second set of SRSs is the same as a last subband (e.g., subband 2) of the first frequency hopping pattern used for transmitting the first set of SRSs. As noted, an antenna switch may occur between transmission of a last SRS (e.g., 506) of the first set of SRSs transmitted using the last subband (e.g., subband 2) of the first frequency hopping pattern and transmission of a first SRS (e.g., 508) of the second set of SRSs transmitted using the first subband (e.g., subband 0) of the second frequency hopping pattern. To accommodate the antenna switch between the last SRS (e.g., 506) of the first set of SRSs and the first SRS (e.g., 508) of the second set of SRSs, a gap symbol may be configured between the last SRS (e.g., 506) of the first set of SRSs and the first SRS (e.g., 508) of the second set of SRSs.

For example, as illustrated, to accommodate the switch from antenna 0 to antenna 1, a gap symbol may be configured in symbol 5 after which the UE may transmit SRS 508 on subband 0 in symbol 6, SRS 510 on subband 1 in symbol 8, and SRS 512 on subband 2 in symbol 10, using the same subband order as the first set of SRSs. Similarly, since the UE changes subbands between SRS transmissions of the second set of SRSs, a gap symbol may be included between each SRS transmission (e.g., in symbols 6 and 7). Accordingly, the BS may receive the first set of SRSs (e.g., SRS 502, SRS 504, and SRS 506) transmitted from a first antenna and receive the second set of SRSs (e.g., SRS 508, SRS 510, and SRS 512) transmitted from a second antenna.

Figure 6:
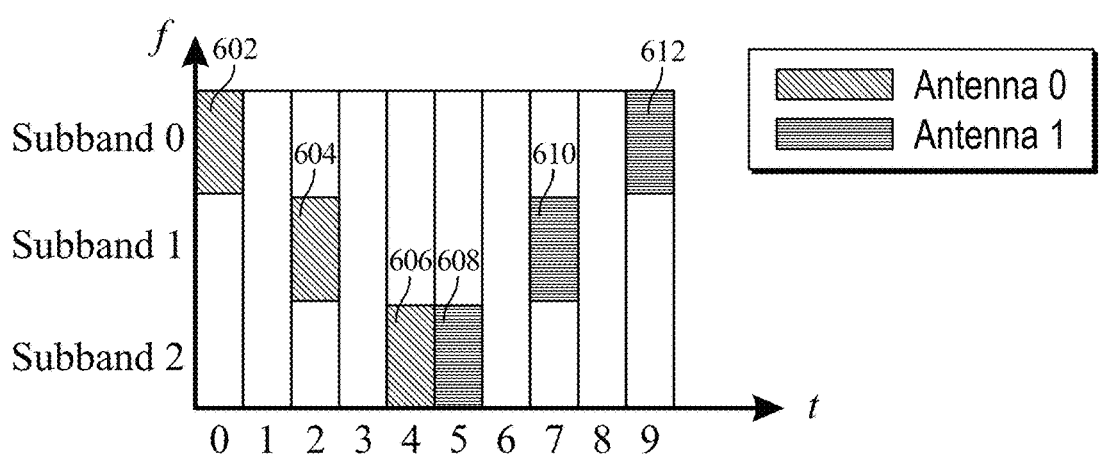
FIG. 6 illustrates reversing a subband order for transmitting one or more SRSs, in accordance with certain aspects of the present disclosure.

In some cases, the first frequency hopping pattern may different from the second frequency hopping pattern. For example, in some cases, using the first SRS frequency hopping pattern to generate the second SRS frequency hopping pattern may comprise reversing an order of subbands in the first SRS frequency hopping pattern, as illustrated in FIG. 6 and explained below. For example, assuming a subband order of subband 0→subband 1→subband 2 for the first SRS frequency hopping pattern, using the first SRS frequency hopping pattern to generate the second SRS frequency hopping pattern may include reversing the subband order of the first SRS frequency hopping pattern such that the subband order for the second frequency hopping pattern is subband 2→subband 1→subband 0. Accordingly, after receiving the first set of SRSs according to a subband order for the first set of SRSs, the base station may receive the second set of SRSs according to a reversed subband order for the first set of SRSs.

Further in another example, SRS 1T4R with antenna indices {0, 1, 2, 3} may be configured together with frequency hopping assuming a subband order of subband 0→subband 1→subband 2 for the first SRS frequency hopping pattern on antenna index 0. In this case, for the frequency hopping pattern on antenna index 1, using the first SRS frequency hopping pattern to generate the second SRS frequency hopping pattern may include reversing the subband order of the first SRS frequency hopping pattern such that the subband order for the second frequency hopping pattern is subband 2→subband 1→subband 0, so that the last subband index on antenna 0 is same as the starting subband index on antenna 1.

Additionally, in some cases, for the frequency hopping pattern on antenna index 2, using the first SRS frequency hopping pattern to generate the second SRS frequency hopping pattern may include repeating the subband order of the first SRS frequency hopping pattern such that the subband order for the second frequency hopping pattern is subband 0→subband 1→subband 2, so that the last subband index on antenna 1 is same as the starting subband index on antenna 2.

Additionally, in some cases, for the frequency hopping pattern on antenna index 3, using the first SRS frequency hopping pattern to generate the second SRS frequency hopping pattern may include reversing the subband order of the first SRS frequency hopping pattern such that the subband order for the second frequency hopping pattern is subband 2→subband 1→subband 0, so that the last subband index on antenna 2 is same as the starting subband index on antenna 3.

Figure 7:
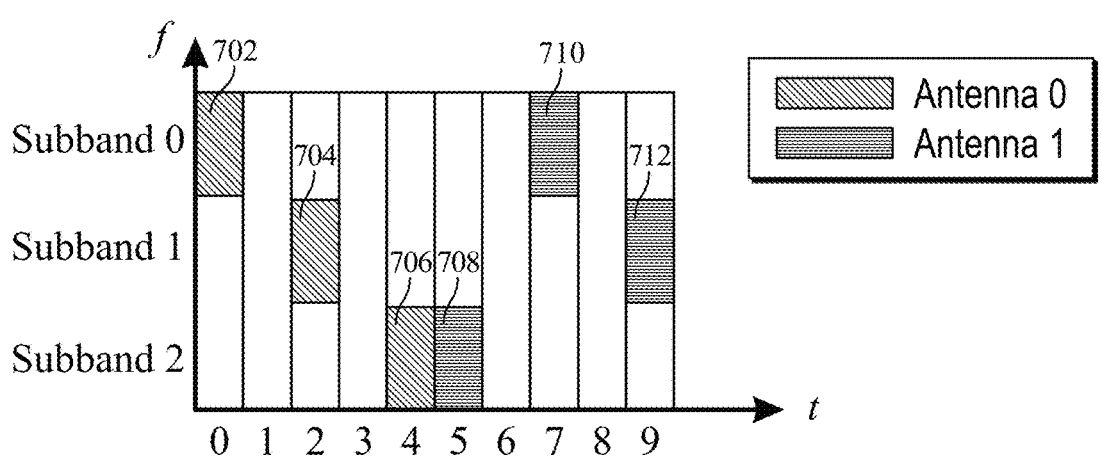
FIG. 7 illustrates applying a cyclic shift to a subband order for transmitting one or more SRSs, in accordance with certain aspects of the present disclosure.

In other cases, using the first SRS frequency hopping pattern to generate the second SRS frequency hopping pattern may comprise applying a cyclic shift to the subband order of the first SRS frequency hopping pattern. According to aspects, applying the cyclic shift to the subband order of the first SRS frequency hopping pattern may change the subband order for SRSs after the first SRS of the second set of SRSs, as illustrated in FIG. 7 and explained below. For example, again assuming a subband order of subband 0→subband 1→subband 2 for the first SRS frequency hopping pattern, applying the cyclic shift to the subband order of the first SRS frequency hopping band to generate the second SRS frequency hopping band may result in a subband order for the second SRS frequency hopping pattern of subband 2→subband 0→subband 1, so that the last subband index on previous antenna index is same as the starting subband index on next antenna index. Accordingly, after receiving the first set of SRSs according to a subband order for the first set of SRSs, the base station may receive the second set of SRSs according to cyclically-sifted subband order for the first set of SRSs.

In another example, SRS 1T4R with antenna indices {0, 1, 2, 3} may be configured together with frequency hopping assuming a subband order of subband 0→subband 1→subband 2 for the first SRS frequency hopping pattern on antenna index 0. In this case, for the frequency hopping pattern on antenna index 1, using the first SRS frequency hopping pattern to generate the second SRS frequency hopping pattern may include adding a cyclic-shift offset on the subband order of the first SRS frequency hopping pattern such that the subband order for the second frequency hopping pattern is subband 2→subband 0→subband 1, so that the last subband index on antenna 0 is same as the starting subband index on antenna 1.

Additionally, in some cases, for the frequency hopping pattern on antenna index 2, using the first SRS frequency hopping pattern to generate the second SRS frequency hopping pattern may include adding a cyclic-shift offset on the subband order the subband order of the first SRS frequency hopping pattern such that the subband order for the second frequency hopping pattern is subband 1→subband 2→subband 0, so that the last subband index on antenna 1 is same as the starting subband index on antenna 2.

Additionally, in some cases, for the frequency hopping pattern on antenna index 3, using the first SRS frequency hopping pattern to generate the second SRS frequency hopping pattern may include repeating the subband order of the first SRS frequency hopping pattern such that the subband order for the second frequency hopping pattern is subband 0→subband 1→subband 2, so that the last subband index on antenna 2 is same as the starting subband index on antenna 3.

According to aspects, in either case of reversing the subband order or applying a cyclic shift, a first SRS of the second set of SRSs may be transmitted on a same subband as a last SRS of the first set of SRSs. According to aspects, since the first SRS of the second set of SRSs and the last SRS of the first set of SRSs are transmitted on the same subband, when an antenna switch occurs, the UE may not need a gap symbol since the UE does not need to change frequency bands.

Additionally, in either case of reversing the subband order or applying a cyclic shift, the first SRS frequency hopping pattern and the second SRS frequency hopping pattern may be determined according to equation 3:

$$N = R^* N_{AS}^* N_{FH} + (N_{AS}-1)^* G_{AS} + N_{AS}^* (N_{FH}-1)^* G_{FH}, \quad \text{(eq. 3)}$$

where N is a total duration in terms of OFDM symbols for transmission of the additional SRS symbols given by the higher-layer parameter additionalSRS-duration, R is a repetition factor associated with the transmission of the additional SRS symbols given by higher-layer parameter additionaSRS-RepNum, $N_{AS}$ is a number of antenna switches associated with the transmission of the additional SRS symbols, $N_{FH}$ is a number of frequency hops with a same antenna associated with transmission of the additional SRS symbols, $G_{AS}$ is a guard symbol configuration value for antenna switching given by the higher-layer parameter additionalSRS-GuardSymbolAS, and $G_{FH}$ is a guard symbol configuration value for frequency hopping given by the higher-layer parameter additionalSRS-GuardSymbolFH.

Alternatively, Equation 1 may be changed to Equation 3, but the SRS frequency hopping pattern may be repeated per antenna without modification. To avoid the additional gap, the UE may regard the configuration of $G_{FH}=1$ and $G_{AS}=0$ as an error case (e.g., UE is not expected to be configured with $G_{FH}=1$ and $G_{AS}=0$).

FIG. 6 illustrates reversing a subband order for transmitting one or more SRSs, according to certain aspects. For example, as illustrated the UE may transmit a first set of SRSs of one or more SRSs according to a first SRS frequency hopping pattern using a first antenna (e.g., antenna 0). As shown the first SRS frequency hopping pattern may include a subband order for transmitting the first set of SRSs, which includes, for example, transmitting a first SRS 602 on subband 0 in symbol 0, transmitting a second SRS 604 on subband 1 in symbol 2, and transmitting a second SRS 606 on subband 2 in symbol 4. As shown, since the UE changes subbands between SRS transmissions of the first set of SRSs, a gap symbol may be included between each SRS transmission (e.g., in symbols 1 and 3). Thereafter, the UE may switch to antenna 1 and transmit a second set of SRSs of the one or more SRSs. As illustrated, the second set of SRSs may be transmitted according to a second SRS frequency hopping pattern, which may include reversing the subband order of the first set of SRSs. For example, as illustrated, after switching to antenna 1, the UE may transmit SRS 608 on subband 2 in symbol 5, SRS 610 on subband 1 in symbol 7, and SRS 612 on subband 0 in symbol 9. Accordingly, the BS may receive the first set of SRSs (e.g., SRS 602, SRS 604, and SRS 606) transmitted from a first antenna and receive the second set of SRSs (e.g., SRS 608, SRS 610, and SRS 612) transmitted from a second antenna.

According to aspects, since the last symbol of the first set of SRSs (e.g., SRS 606) and a first symbol of the second set of SRSs (e.g., SRS 608) are transmitted on the same subband (e.g., subband 2), the UE may not require a gap symbol between SRS 606 and SRS 608 since the UE does not have to switch frequencies (e.g., subbands). Removing the need for this gap symbol may improve network efficiency (e.g., using symbols more efficiently) and saves power at the UE (e.g., since the UE does not need to expend energy retuning between antenna switches).

FIG. 7 illustrates applying a cyclic shift to a subband order for transmitting one or more SRSs, according to certain aspects. For example, as illustrated the UE may transmit a first set of SRSs of one or more SRSs according to a first SRS frequency hopping pattern using a first antenna (e.g., antenna 0). As shown the first SRS frequency hopping pattern may include a subband order for transmitting the first set of SRSs, which includes, for example, transmitting a first SRS 702 on subband 0 in symbol 0, transmitting a second SRS 704 on subband 1 in symbol 2, and transmitting a second SRS 706 on subband 2 in symbol 4. As shown, since the UE changes subbands between SRS transmissions of the first set of SRSs, a gap symbol may be included between each SRS transmission (e.g., in symbols 1 and 3). Thereafter, the UE may switch to antenna 1 and transmit a second set of SRSs of the one or more SRSs. As illustrated, the second set of SRSs may be transmitted according to a second SRS frequency hopping pattern, which may include applying a cyclic shift to the subband order of the first set of SRSs. For example, as illustrated, after switching to antenna 1, the UE may transmit SRS 708 on subband 2 in symbol 5, SRS 710 on subband 0 in symbol 7, and SRS 712 on subband 1 in symbol 9. Accordingly, the BS may receive the first set of SRSs (e.g., SRS 702, SRS 704, and SRS 706) transmitted from a first antenna and receive the second set of SRSs (e.g., SRS 708, SRS 710, and SRS 712) transmitted from a second antenna.

According to aspects, since the last symbol of the first set of SRSs (e.g., SRS 706) and a first symbol of the second set of SRSs (e.g., SRS 708) are transmitted on the same subband (e.g., subband 2), the UE may not require a gap symbol between SRS 706 and SRS 708 since the UE does not have to switch frequencies (e.g., subbands). Removing the need for this gap symbol may improve network efficiency (e.g., using symbols more efficiently) and saves power at the UE (e.g., since the UE does not need to expend energy retuning between antenna switches).

Figure 8:
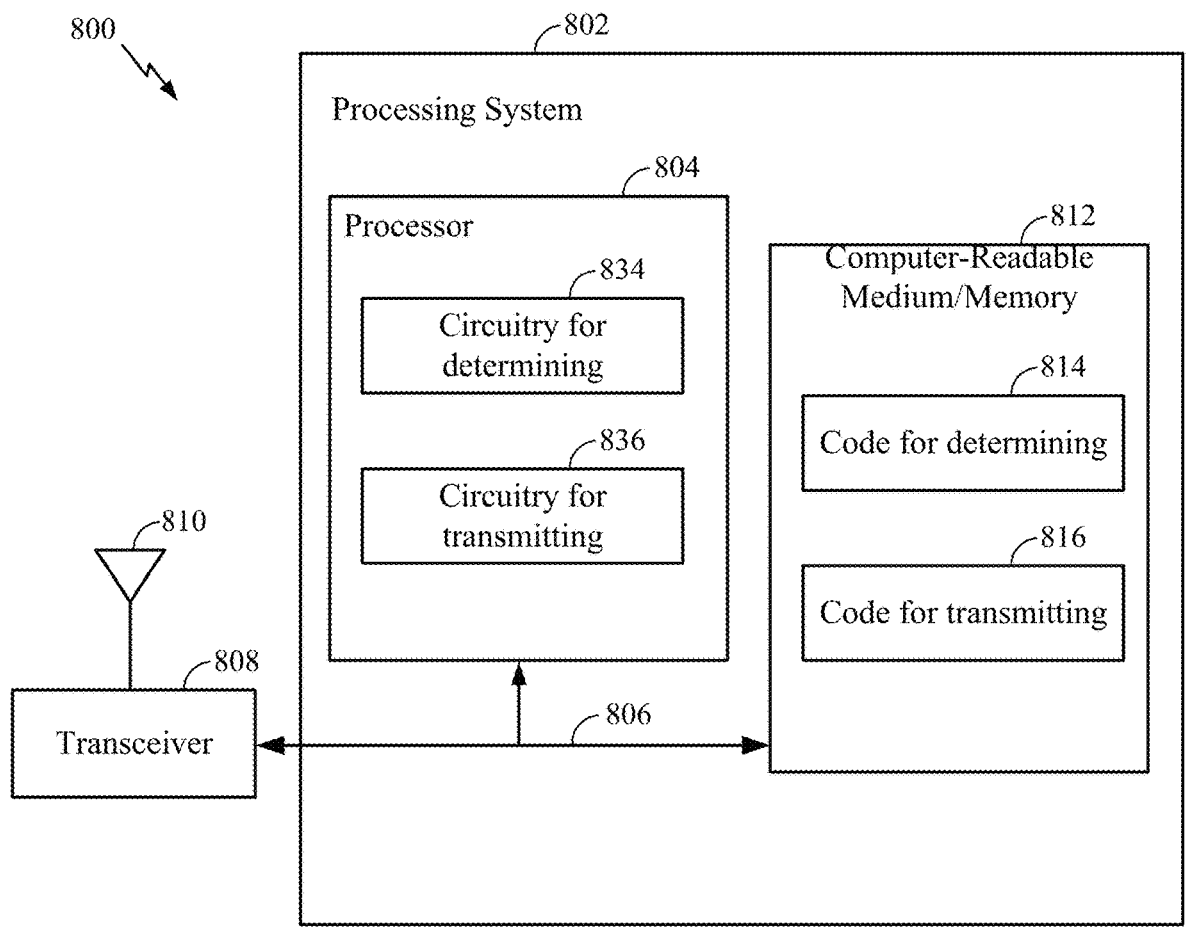
FIG. 8 illustrates a communications device that may include various components configured to perform operations for the techniques disclosed herein in accordance with aspects of the present disclosure.

FIG. 8 illustrates a communications device 800 that may include various components (e.g., corresponding to means-plus-function components) configured to perform operations for the techniques disclosed herein, such as the operations illustrated in FIG. 3 as well as other operations disclosed herein for frequency hopping enhancements for SRS transmission. The communications device 800 includes a processing system 802 coupled to a transceiver 808. The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIG. 3, or other operations for performing the various techniques discussed herein for frequency hopping enhancements for SRS transmission. In certain aspects, computer-readable medium/memory 812 stores code for performing the operations illustrated in one or more of FIG. 3 as well as other operations disclosed herein for frequency hopping enhancements for SRS transmission. For example, computer-readable medium/memory 812 stores code 814 for determining, code 816 for transmitting, code 818 for using, code 820 for reversing, code 822 for applying, and code 824 for repeating.

In some cases, the code 814 for determining may include code for determining a first sounding reference signal (SRS) frequency hopping pattern for transmitting one or more SRSs.

In some cases, the code 814 for determining may include code for determining an antenna switch will occur during the transmission of the one or more SRSs.

In some cases, the code 814 for determining may include code for determining a second SRS frequency hopping pattern for transmitting the one or more SRSs.

In some cases, the code 816 for transmitting may include code for transmitting a first set of SRSs of the one or more SRSs according to the first SRS frequency hopping pattern and transmitting a second set of SRSs of the one or more SRSs according to the second SRS frequency hopping pattern.

In some cases, the code 818 for using may include code for using the first SRS frequency hopping pattern to generate the second SRS frequency hopping pattern based on the determined antenna switch.

In some cases, code 820 for reversing may include code for reversing an order of subbands in the first SRS frequency hopping pattern to generate the second SRS frequency hopping pattern.

In some cases, code 822 for applying may include code for applying a cyclic shift to an order of subbands in the first SRS frequency hopping pattern to generate the second SRS frequency hopping pattern.

In some cases, code 824 for repeating may include code for repeating the order of subbands in the first SRS frequency hopping pattern at least for a subset of antenna indices to generate the second SRS frequency hopping pattern.

In some cases, code 814 for determining may include code for determining at least one of the first SRS frequency hopping pattern or the second SRS frequency hopping pattern according to equation 2 described above.

In some cases, code 814 for determining may include code for determining at least one of the first SRS frequency hopping pattern or the second SRS frequency hopping pattern according to equation 3 described above.

In some cases, code 816 for transmitting may include code for transmitting a first SRS of the second set of SRSs in a symbol immediately after a last SRS of the first set of SRSs.

In some cases, code 816 for transmitting may include code for transmitting the first set of SRSs using a first antenna.

In some cases, code 816 for transmitting may include code for switching to a second antenna and transmitting the second set of SRSs using the second antenna.

In certain aspects, the processor 804 may include circuitry configured to implement the code stored in the computer-readable medium/memory 812, such as for performing the operations illustrated in FIG. 3 as well as other operations disclosed herein for frequency hopping enhancements for SRS transmission. For example, the processor 804 includes circuitry 834 for determining, circuitry 836 for transmitting, circuitry 838 for using, circuitry 840 for reversing, circuitry 842 for applying, and circuitry 844 for repeating.

In some cases, the circuitry 834 for determining may include circuitry for determining a first sounding reference signal (SRS) frequency hopping pattern for transmitting one or more SRSs.

In some cases, the circuitry 834 for determining may include circuitry for determining an antenna switch will occur during the transmission of the one or more SRSs.

In some cases, the circuitry 834 for determining may include circuitry for determining a second SRS frequency hopping pattern for transmitting the one or more SRSs.

In some cases, the circuitry 836 for transmitting may include circuitry for transmitting a first set of SRSs of the one or more SRSs according to the first SRS frequency hopping pattern and transmitting a second set of SRSs of the one or more SRSs according to the second SRS frequency hopping pattern.

In some cases, the circuitry 838 for using may include circuitry for using the first SRS frequency hopping pattern to generate the second SRS frequency hopping pattern based on the determined antenna switch.

In some cases, circuitry 840 for reversing may include circuitry for reversing an order of subbands in the first SRS frequency hopping pattern to generate the second SRS frequency hopping pattern.

In some cases, circuitry 842 for applying may include circuitry for applying a cyclic shift to an order of subbands in the first SRS frequency hopping pattern to generate the second SRS frequency hopping pattern.

In some cases, circuitry 844 for repeating may include circuitry for repeating the order of subbands in the first SRS frequency hopping pattern at least for a subset of antenna indices to generate the second SRS frequency hopping pattern.

In some cases, circuitry 834 for determining may include circuitry for determining at least one of the first SRS frequency hopping pattern or the second SRS frequency hopping pattern according to equation 2 described above.

In some cases, circuitry 834 for determining may include circuitry for determining at least one of the first SRS frequency hopping pattern or the second SRS frequency hopping pattern according to equation 3 described above.

In some cases, circuitry 836 for transmitting may include circuitry for transmitting a first SRS of the second set of SRSs in a symbol immediately after a last SRS of the first set of SRSs.

In some cases, circuitry 836 for transmitting may include circuitry for transmitting the first set of SRSs using a first antenna.

In some cases, circuitry 836 for transmitting may include circuitry for switching to a second antenna and transmitting the second set of SRSs using the second antenna.

Figure 9:
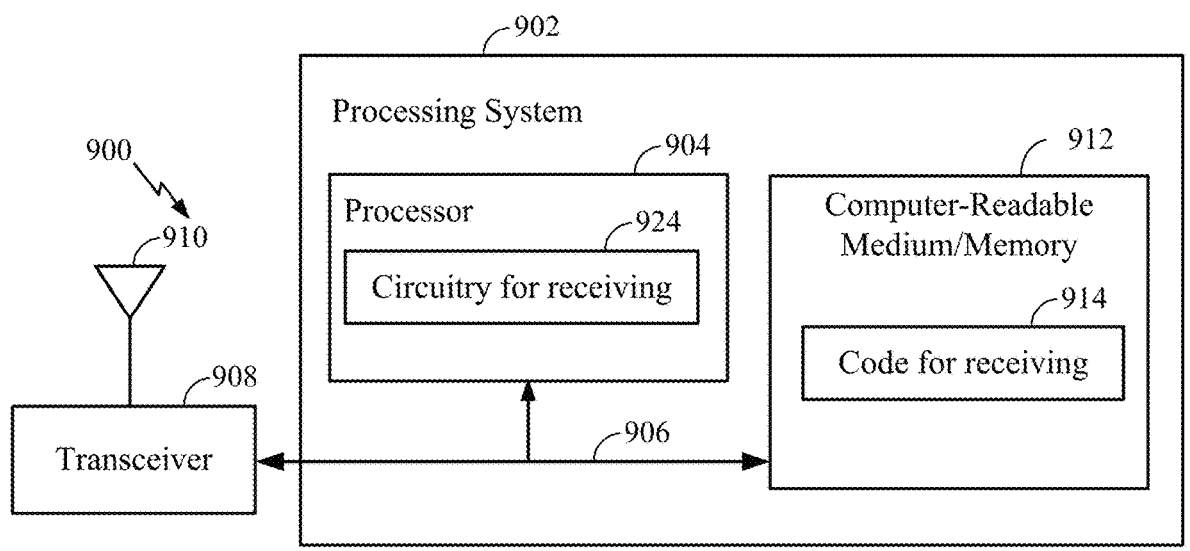
FIG. 9 illustrates a communications device that may include various components configured to perform operations for the techniques disclosed herein in accordance with aspects of the present disclosure.

FIG. 9 illustrates a communications device 900 that may include various components (e.g., corresponding to means-plus-function components) configured to perform operations for the techniques disclosed herein, such as the operations illustrated in FIG. 4, as well as other operations disclosed herein for frequency hopping enhancements for SRS transmission. The communications device 900 includes a processing system 902 coupled to a transceiver 908. The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIG. 4, or other operations for performing the various techniques discussed herein for frequency hopping enhancements for SRS transmission. In certain aspects, computer-readable medium/memory 912 stores code for performing the operations illustrated in one or more of FIG. 4 as well as other operations disclosed herein for frequency hopping enhancements for SRS transmission. For example, computer-readable medium/memory 912 stores code 914 for receiving.

In some cases, code 914 for receiving may include code for receiving a first set of SRSs of one or more SRSs in a subframe according to a first SRS frequency hopping pattern.

In some cases, code 914 for receiving may include code for receiving a second set of SRSs of one or more SRSs in the subframe according to a second SRS frequency hopping pattern.

In some cases, code 914 for receiving may include code for receiving the second set of SRSs on subbands according to a reversed order.

In some cases, code 914 for receiving may include code for receiving the second set of SRSs on subbands according to a cyclic shift.

In some cases, code 914 for receiving may include code for receiving the second set of SRSs on subbands according to a same order of subbands as the first SRS frequency hopping pattern.

In some cases, code 914 for receiving may include code for receiving a first SRS of the second set of SRSs in a symbol immediately after a last SRS of the first set of SRSs.

In some cases, code 914 for receiving may include code for receiving the first set of SRSs transmitted from a first antenna and receiving the second set of SRSs transmitted from a second antenna.

In certain aspects, the processor 904 may include circuitry configured to implement the code stored in the computer-readable medium/memory 912, such as for performing the operations illustrated in FIG. 4 as well as other operations disclosed herein for frequency hopping enhancements for SRS transmission. For example, the processor 904 includes circuitry 924 for receiving.

In some cases, circuitry 924 for receiving may include circuitry for receiving a first set of SRSs of one or more SRSs in a subframe according to a first SRS frequency hopping pattern.

In some cases, circuitry 924 for receiving may include circuitry for receiving a second set of SRSs of one or more SRSs in the subframe according to a second SRS frequency hopping pattern.

In some cases, circuitry 924 for receiving may include circuitry for receiving the second set of SRSs on subbands according to a reversed order.

In some cases, circuitry 924 for receiving may include circuitry for receiving the second set of SRSs on subbands according to a cyclic shift.

In some cases, circuitry 924 for receiving may include circuitry for receiving the second set of SRSs on subbands according to a same order of subbands as the first SRS frequency hopping pattern.

In some cases, circuitry 924 for receiving may include circuitry for receiving a first SRS of the second set of SRSs in a symbol immediately after a last SRS of the first set of SRSs.

In some cases, circuitry 924 for receiving may include circuitry for receiving the first set of SRSs transmitted from a first antenna and receiving the second set of SRSs transmitted from a second antenna.

EXAMPLE ASPECTS

Aspect 1: An apparatus for wireless communication by a user equipment (UE), comprising: at least one processor configured to: determine a first sounding reference signal (SRS) frequency hopping pattern for transmitting one or more SRSs; determine an antenna switch will occur during the transmission of the one or more SRSs; determine a second SRS frequency hopping pattern for transmitting the one or more SRSs, wherein determining the second SRS frequency hopping pattern comprises using the first SRS frequency hopping pattern to generate the second SRS frequency hopping pattern based on the determined antenna switch; and transmit a first set of SRSs of the one or more SRSs according to the first SRS frequency hopping pattern and transmitting a second set of SRSs of the one or more SRSs according to the second SRS frequency hopping pattern; and a memory coupled with the at least one processor.

Aspect 2: The apparatus of Aspect 1, wherein the at least one processor is configured to use the first SRS frequency hopping pattern to generate the second SRS frequency hopping pattern by reversing an order of subbands in the first SRS frequency hopping pattern.

Aspect 3: The apparatus of any of Aspects 1-2, wherein the at least one processor is configured to use the first SRS frequency hopping pattern to generate the second SRS frequency hopping pattern by applying a cyclic shift to an order of subbands in the first SRS frequency hopping pattern.

Aspect 4: The apparatus of any of Aspects 1 or 3, wherein the at least one processor is configured to use the first SRS frequency hopping pattern to generate the second SRS frequency hopping pattern by repeating the order of subbands in the first SRS frequency hopping pattern at least for a subset of antenna indices.

Aspect 5: The apparatus of claim 4, wherein, based on the repeated order of subbands: a first subband of the second SRS frequency hopping pattern used for transmitting the second set of SRSs is the same as a first subband of the first frequency hopping pattern used for transmitting the first set of SRSs; and a last subband of the second SRS frequency hopping pattern used for transmitting the second set of SRSs is the same as a last subband of the first frequency hopping pattern used for transmitting the first set of SRSs.

Aspect 6: The apparatus of claim 5, wherein: the antenna switch occurs between transmission of a last SRS of the first set of SRSs transmitted using the last subband of the first frequency hopping pattern and transmission of a first SRS of the second set of SRSs transmitted using the first subband of the second frequency hopping pattern; and a gap symbol is configured between the last SRS of the first set of SRSs and the first SRS of the second set of SRSs to accommodate the antenna switch.

Aspect 7: The apparatus of any of Aspects 4-6, wherein the at least one processor is configured to determine at least one of the first SRS frequency hopping pattern or the second SRS frequency hopping pattern according to:

$$N=RN_{AS}N_{FH}+(N_{AS}-1)G_{AS}+(N_{FH}-1)N_{AS}G_{FH}+(N_{AS}-1)(1-G_{AS})G_{FH},$$

where N is a total duration associated with the one or more SRSs, R is a repetition factor associated with the one or more SRSs, $N_{AS}$ is a number of antenna switches associated with the one or more SRSs, $N_{FH}$ is a number of frequency hops with the same antenna/antenna pair associated with the one or more SRSs, $G_{AS} \in \{0, 1\}$ is a guard symbol configuration value for antenna switching, and $G_{FH} \in \{0, 1\}$ is a guard symbol configuration value for frequency hopping of the one or more SRSs.

Aspect 8: The apparatus of any of Aspects 1-6, wherein the at least one processor is configured to determine at least one of the first SRS frequency hopping pattern or the second SRS frequency hopping pattern according to:

$$N=R*N_{AS}+N_{FH}+(N_{AS}-1)*G_{AS}+N_{AS}*(N_{FH}-1)*G_{FH},$$

where N is a total duration associated with the one or more SRSs, R is a repetition factor associated with the one or more SRSs, $N_{AS}$ is a number of antenna switches associated with the one or more SRSs, $N_{FH}$ is a number of frequency hops associated with the one or more SRSs, $G_{AS}$ is a guard symbol configuration value for antenna switching, and $G_{FH}$ is a guard symbol configuration value for frequency hopping.

Aspect 9: The apparatus of any of Aspects 1-8, wherein the first SRS frequency hopping pattern and the second SRS frequency hopping pattern depend on at least one of a guard symbol configuration value for frequency hopping or a guard symbol configuration value for antenna switching.

Aspect 10: The apparatus of any of Aspects 1-9, wherein at least the second SRS frequency hopping pattern is different for different guard symbol configuration values for frequency hopping or guard symbol configuration values for antenna switching.

Aspect 11: The apparatus of any of Aspects 1-10, wherein there is no gap symbol between a last SRS of the first set of SRSs and a first SRS of the second set of SRSs.

Aspect 12: The apparatus of any of Aspects 1-11, wherein the at least one processor is configured to transmit the first set of SRSs and transmitting the second set of SRSs by transmitting a first SRS of the second set of SRSs in a symbol immediately after a last SRS of the first set of SRSs.

Aspect 13: The apparatus of any of Aspects 1-12, wherein the at least one processor is configured to: transmit the first set of SRSs by transmitting the first set of SRSs using a first antenna; and transmit the second set of SRSs by switching to a second antenna and transmitting the second set of SRSs using the second antenna, wherein the second antenna is different from the first antenna.

Aspect 14: The apparatus of any of Aspects 1-13, wherein the first frequency hopping pattern is different from the second frequency hopping pattern.

Aspect 15: An apparatus for wireless communication by a base station (BS), comprising: at least one processor configured to: receive a first set of SRSs of one or more SRSs in a subframe according to a first SRS frequency hopping pattern; and receive a second set of SRSs of one or more SRSs in the subframe according to a second SRS frequency hopping pattern, wherein the second SRS frequency hopping pattern is generated from the first SRS frequency hopping pattern based on an antenna switch in the subframe; and a memory coupled with the at least one processor.

Aspect 16: The apparatus of Aspect 15, wherein: the second SRS frequency hopping pattern comprises a reversed order of subbands as compared to the first SRS frequency hopping pattern; and the at least one processor is configured to receive the second set of SRSs by receiving the second set of SRSs on subbands according to the reversed order of subbands.

Aspect 17: The apparatus of any of Aspects 15-14, wherein the second SRS frequency hopping pattern comprises a cyclic shift applied to an order of subbands of the first SRS frequency hopping pattern; and the at least one processor is configured to receive the second set of SRSs by receiving the second set of SRSs on subbands according to the cyclic shift.

Aspect 18: The apparatus of any of Aspects 15 or 15, wherein: the second SRS frequency hopping pattern comprises a same order of subbands as the first SRS frequency hopping pattern at least for a subset of antenna indices; and the at least one processor is configured to receive the second set of SRSs by receiving the second set of SRSs on subbands according to the same order of subbands as the first SRS frequency hopping pattern.

Aspect 19: The apparatus of claim 18, wherein, based on the same order of subbands: a first subband of the second SRS frequency hopping pattern used for receiving the second set of SRSs is the same as a first subband of the first frequency hopping pattern used for receiving the first set of SRSs; and a last subband of the second SRS frequency hopping pattern used for receiving the second set of SRSs is the same as a last subband of the first frequency hopping pattern used for receiving the first set of SRSs.

Aspect 20: The apparatus of claim 19, wherein: the antenna switch occurs between reception of a last SRS of the first set of SRSs received using the last subband of the first frequency hopping pattern and reception of a first SRS of the second set of SRSs received using the first subband of the second frequency hopping pattern; and a gap symbol is configured between the last SRS of the first set of SRSs and the first SRS of the second set of SRSs to accommodate the antenna switch.

Aspect 21. The apparatus of any of Aspects 18-20, wherein at least one of the first SRS frequency hopping pattern or the second SRS frequency hopping pattern is determined according to:

$$N=RN_{AS}N_{FH}+(N_{AS}-1)G_{AS}+(N_{FH}-1)N_{AS}G_{FH}+(N_{AS}-1)(1-G_{AS})G_{FH},$$

where N is a total duration associated with the one or more SRSs, R is a repetition factor associated with the one or more SRSs, $N_{AS}$ is a number of antenna switches associated with the one or more SRSs, $N_{FH}$ is a number of frequency hops with the same antenna or antenna pair associated with the one or more SRSs, $G_{AS} \in \{0, 1\}$ is a guard symbol configuration value for antenna switching, and $G_{FH} \in \{0, 1\}$ is a guard symbol configuration value for frequency hopping of the one or more SRSs.

Aspect 22: The apparatus of any of Aspects 15-20, wherein at least one of the first SRS frequency hopping pattern or the second SRS frequency hopping pattern is determined according to:

$$N=R*N_{AS}*N_{FH}+(N_{AS}-1)*G_{AS}+N_{AS}*(N_{FH}-1)*G_{FH},$$

where N is a total duration associated with the one or more SRSs, R is a repetition factor associated with the one or more SRSs, $N_{AS}$ is a number of antenna switches associated with the one or more SRSs, $N_{FH}$ is a number of frequency hops associated with the one or more SRSs, $G_{AS}$ is a guard symbol configuration value for antenna switching, and $G_{FH}$ is a guard symbol configuration value for frequency hopping.

Aspect 23: The apparatus of any of Aspects 15-22, wherein the first SRS frequency hopping pattern and the second SRS frequency hopping pattern depend on at least one of a guard symbol configuration value for frequency hopping or a guard symbol configuration value for antenna switching.

Aspect 24: The apparatus of any of Aspects 15-23, wherein at least the second SRS frequency hopping pattern is different for different guard symbol configuration values for frequency hopping or guard symbol configuration values for antenna switching.

Aspect 25: The apparatus of any of Aspects 15-24, wherein there is no gap symbol between a last SRS of the first set of SRSs and a first SRS of the second set of SRSs.

Aspect 26: The apparatus of any of Aspect 15-25, wherein the at least one processor is configured to receive the first set of SRSs and receive the second set of SRSs by receiving a first SRS of the second set of SRSs in a symbol immediately after a last SRS of the first set of SRSs.

Aspect 27: The apparatus of any of Aspects 15-26, wherein the at least one processor is configured to receive the first set of SRSs and receive the second set of SRSs by receiving the first set of SRSs transmitted from a first antenna and receiving the second set of SRSs transmitted from a second antenna.

Aspect 28: The apparatus of any of Aspects 15-27, wherein the first frequency hopping pattern is different from the second frequency hopping pattern.

Aspect 29: A method, performed by a user equipment (UE), for wireless communication, comprising: determining a first sounding reference signal (SRS) frequency hopping pattern for transmitting one or more SRSs; determining an antenna switch will occur during the transmission of the one or more SRSs; determining a second SRS frequency hopping pattern for transmitting the one or more SRSs, wherein determining the second SRS frequency hopping pattern comprises using the first SRS frequency hopping pattern to generate the second SRS frequency hopping pattern based on the determined antenna switch; and transmitting a first set of SRSs of the one or more SRSs according to the first SRS frequency hopping pattern and transmitting a second set of SRSs of the one or more SRSs according to the second SRS frequency hopping pattern.

Aspect 30: The method of Aspect 29, further comprising determining at least one of the first SRS frequency hopping pattern or the second SRS frequency hopping pattern according to:

$$N=RN_{AS}N_{FH}+(N_{AS}-1)G_{AS}+(N_{FH}-1)N_{AS}G_{FH}+(N_{AS}-1)(1-G_{AS})G_{FH}$$

where N is a total duration associated with the one or more SRSs, R is a repetition factor associated with the one or more SRSs, $N_{AS}$ is a number of antenna switches associated with the one or more SRSs, $N_{FH}$ is a number of frequency hops with the same antenna or antenna pair associated with the one or more SRSs, $G_{AS} \in \{0, 1\}$ is a guard symbol configuration value for antenna switching, and $G_{FH} \in \{0, 1\}$ is a guard symbol configuration value for frequency hopping of the one or more SRSs.

Aspect 31: The method of Aspect 29, further comprising determining at least one of the first SRS frequency hopping pattern or the second SRS frequency hopping pattern according to:

$$N=R*N_{AS}*N_{FH}+(N_{AS}-1)*G_{AS}+N_{AS}*(N_{FH}-1)*G_{FH},$$

where N is a total duration associated with the one or more SRSs, R is a repetition factor associated with the one or more SRSs, $N_{AS}$ is a number of antenna switches associated with the one or more SRSs, $N_{FH}$ is a number of frequency hops associated with the one or more SRSs, $G_{AS}$ is a guard symbol configuration value for antenna switching, and $G_{FH}$ is a guard symbol configuration value for frequency hopping.

Aspect 32: A method, performed by a base station (BS), for wireless communication, comprising: receiving a first set of SRSs of one or more SRSs in a subframe according to a first SRS frequency hopping pattern; and receiving a second set of SRSs of one or more SRSs in the subframe according to a second SRS frequency hopping pattern, wherein the second SRS frequency hopping pattern is generated from the first SRS frequency hopping pattern based on an antenna switch in the subframe.

Aspect 33: The method of Aspect 32, wherein at least one of the first SRS frequency hopping pattern or the second SRS frequency hopping pattern is determined according to:

$$N=RN_{AS}N_{FH}+(N_{AS}-1)G_{AS}+(N_{FH}-1)N_{AS}G_{FH}+(N_{AS}-1)(1-G_{AS})G_{FH}$$

where N is a total duration associated with the one or more SRSs, R is a repetition factor associated with the one or more SRSs, $N_{AS}$ is a number of antenna switches associated with the one or more SRSs, $N_{FH}$ is a number of frequency hops with the same antenna or antenna pair associated with the one or more SRSs, $G_{AS} \in \{0, 1\}$ is a guard symbol configuration value for antenna switching, and $G_{FH} \in \{0, 1\}$ is a guard symbol configuration value for frequency hopping of the one or more SRSs.

Aspect 34: The method of Aspect 32, wherein at least one of the first SRS frequency hopping pattern or the second SRS frequency hopping pattern is determined according to:

$$N=R*N_{AS}*N_{FH}+(N_{AS}-1)*G_{AS}+N_{AS}*(N_{FH}-1)*G_{FH},$$

where N is a total duration associated with the one or more SRSs, R is a repetition factor associated with the one or more SRSs, $N_{AS}$ is a number of antenna switches associated with the one or more SRSs, $N_{FH}$ is a number of frequency hops associated with the one or more SRSs, $G_{AS}$ is a guard symbol configuration value for antenna switching, and $G_{FH}$ is a guard symbol configuration value for frequency hopping.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. ABS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 3-4.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communication by a user equipment (UE), comprising:
   at least one processor configured to:
      determine a first sounding reference signal (SRS) frequency hopping pattern for transmitting one or more SRSs;
      determine an antenna switch will occur during transmission of the one or more SRSs;
      determine a second SRS frequency hopping pattern for transmitting the one or more SRSs, wherein the at least one processor is configured to:
         use the first SRS frequency hopping pattern to generate the second SRS frequency hopping pattern based on the determined antenna switch; and
         determine at least one of the first SRS frequency hopping pattern or the second SRS frequency hopping pattern according to:

$N = R N_{AS} N_{FH} + (N_{AS}-1) G_{AS} + (N_{FH}-1) N_{AS} G_{FH} + (N_{AS}-1)(1-G_{AS}) G_{FH}$, where N is a total duration associated with the one or more SRSs, R is a repetition factor associated with the one or more SRSs, $N_{AS}$ is a number of antenna switches associated with the one or more SRSs, $N_{FH}$ is a number of frequency hops with a same antenna or antenna pair associated with the one or more SRSs, $G_{AS} \in \{0, 1\}$ is a guard symbol configuration value for antenna switching, and $G_{FH} \in \{0, 1\}$ is a guard symbol configuration value for frequency hopping of the one or more SRSs; and
      transmit a first set of SRSs of the one or more SRSs according to the first SRS frequency hopping pattern and transmit a second set of SRSs of the one or more SRSs according to the second SRS frequency hopping pattern; and
   a memory coupled with the at least one processor.

2. The apparatus of claim 1, wherein the at least one processor is configured to use the first SRS frequency hopping pattern to generate the second SRS frequency hopping pattern by reversing an order of subbands in the first SRS frequency hopping pattern.

3. The apparatus of claim 1, wherein the at least one processor is configured to use the first SRS frequency hopping pattern to generate the second SRS frequency hopping pattern by applying a cyclic shift to an order of subbands in the first SRS frequency hopping pattern.

4. The apparatus of claim 1, wherein the at least one processor is configured to use the first SRS frequency hopping pattern to generate the second SRS frequency hopping pattern by repeating an order of subbands in the first SRS frequency hopping pattern at least for a subset of antenna indices.

5. The apparatus of claim 4, wherein, based on the repeated order of subbands:
   a first subband of the second SRS frequency hopping pattern used for transmitting the second set of SRSs is the same as a first subband of the first frequency hopping pattern used for transmitting the first set of SRSs; and
   a last subband of the second SRS frequency hopping pattern used for transmitting the second set of SRSs is the same as a last subband of the first frequency hopping pattern used for transmitting the first set of SRSs.

6. The apparatus of claim 5, wherein:
   the antenna switch occurs between transmission of a last SRS of the first set of SRSs transmitted using the last subband of the first frequency hopping pattern and transmission of a first SRS of the second set of SRSs transmitted using the first subband of the second frequency hopping pattern; and
   a gap symbol is configured between the last SRS of the first set of SRSs and the first SRS of the second set of SRSs to accommodate the antenna switch.

7. The apparatus of claim 1, wherein the first SRS frequency hopping pattern and the second SRS frequency hopping pattern depend on at least one of a guard symbol configuration value for frequency hopping or a guard symbol configuration value for antenna switching.

8. The apparatus of claim 1, wherein at least the second SRS frequency hopping pattern is different for different guard symbol configuration values for frequency hopping or guard symbol configuration values for antenna switching.

9. The apparatus of claim 1, wherein there is no gap symbol between a last SRS of the first set of SRSs and a first SRS of the second set of SRSs.

10. The apparatus of claim 1, wherein the at least one processor is configured to transmit the first set of SRSs and transmitting the second set of SRSs by transmitting a first SRS of the second set of SRSs in a symbol immediately after a last SRS of the first set of SRSs.

11. The apparatus of claim 1, wherein the at least one processor is configured to:
   transmit the first set of SRSs by transmitting the first set of SRSs using a first antenna; and
   transmit the second set of SRSs by switching to a second antenna and transmitting the second set of SRSs using the second antenna, wherein the second antenna is different from the first antenna.

12. The apparatus of claim 1, wherein the first frequency hopping pattern is different from the second frequency hopping pattern.

13. An apparatus for wireless communication by a base station (BS), comprising:
   at least one processor configured to:
      receive a first set of SRSs of one or more SRSs in a subframe according to a first SRS frequency hopping pattern; and
      receive a second set of SRSs of one or more SRSs in the subframe according to a second SRS frequency hopping pattern, wherein:
         the second SRS frequency hopping pattern is generated from the first SRS frequency hopping pattern based on an antenna switch in the subframe; and
         at least one of the first SRS frequency hopping pattern or the second SRS frequency hopping pattern is determined according to:

$$N = RN_{AS}N_{FH} + (N_{AS}-1)G_{AS} + (N_{FH}-1)N_{AS}G_{FH} + (N_{AS}-1)(1-G_{AS})G_{FH},$$

where N is a total duration associated with the one or more SRSs, R is a repetition factor associated with the one or more SRSs, $N_{AS}$ is a number of antenna switches associated with the one or more SRSs, $N_{FH}$ is a number of frequency hops with a same antenna or antenna pair associated with the one or more SRSs, $G_{AS} \in \{0, 1\}$ is a guard symbol configuration value for antenna switching, and $G_{FH} \in \{0, 1\}$ is a guard symbol configuration value for frequency hopping of the one or more SRSs; and
   a memory coupled with the at least one processor.

14. The apparatus of claim 13, wherein:
   the second SRS frequency hopping pattern comprises a reversed order of subbands as compared to the first SRS frequency hopping pattern; and
   the at least one processor is configured to receive the second set of SRSs by receiving the second set of SRSs on subbands according to the reversed order of subbands.

15. The apparatus of claim 13, wherein:
   the second SRS frequency hopping pattern comprises a cyclic shift applied to an order of subbands of the first SRS frequency hopping pattern; and
   the at least one processor is configured to receive the second set of SRSs by receiving the second set of SRSs on subbands according to the cyclic shift.

16. The apparatus of claim 13, wherein:
   the second SRS frequency hopping pattern comprises a same order of subbands as the first SRS frequency hopping pattern at least for a subset of antenna indices; and
   the at least one processor is configured to receive the second set of SRSs by receiving the second set of SRSs on subbands according to the same order of subbands as the first SRS frequency hopping pattern.

17. The apparatus of claim 16, wherein, based on the same order of subbands:
   a first subband of the second SRS frequency hopping pattern used for receiving the second set of SRSs is the same as a first subband of the first frequency hopping pattern used for receiving the first set of SRSs; and
   a last subband of the second SRS frequency hopping pattern used for receiving the second set of SRSs is the same as a last subband of the first frequency hopping pattern used for receiving the first set of SRSs.

18. The apparatus of claim 17, wherein:
   the antenna switch occurs between reception of a last SRS of the first set of SRSs received using the last subband of the first frequency hopping pattern and reception of a first SRS of the second set of SRSs received using the first subband of the second frequency hopping pattern; and
   a gap symbol is configured between the last SRS of the first set of SRSs and the first SRS of the second set of SRSs to accommodate the antenna switch.

19. The apparatus of claim 13, wherein the first SRS frequency hopping pattern and the second SRS frequency hopping pattern depend on at least one of a guard symbol configuration value for frequency hopping or a guard symbol configuration value for antenna switching.

20. The apparatus of claim 13, wherein at least the second SRS frequency hopping pattern is different for different guard symbol configuration values for frequency hopping or guard symbol configuration values for antenna switching.

21. The apparatus of claim 13, wherein there is no gap symbol between a last SRS of the first set of SRSs and a first SRS of the second set of SRSs.

22. The apparatus of claim 13, wherein the at least one processor is configured to receive the first set of SRSs and receive the second set of SRSs by receiving a first SRS of the second set of SRSs in a symbol immediately after a last SRS of the first set of SRSs.

23. The apparatus of claim 13, wherein the at least one processor is configured to receive the first set of SRSs and receive the second set of SRSs by receiving the first set of SRSs transmitted from a first antenna and receiving the second set of SRSs transmitted from a second antenna.

24. The apparatus of claim 13, wherein the first frequency hopping pattern is different from the second frequency hopping pattern.

25. A method, performed by a user equipment (UE), for wireless communication, comprising:
   determining a first sounding reference signal (SRS) frequency hopping pattern for transmitting one or more SRSs;
   determining an antenna switch will occur during transmission of the one or more SRSs;
   determining a second SRS frequency hopping pattern for transmitting the one or more SRSs, wherein:
      determining the second SRS frequency hopping pattern comprises using the first SRS frequency hopping pattern to generate the second SRS frequency hopping pattern based on the determined antenna switch; and
      at least one of the first SRS frequency hopping pattern or the second SRS frequency hopping pattern is determined according to:

$$N = RN_{AS}N_{FH} + (N_{AS}-1)G_{AS} + (N_{FH}-1)N_{AS}G_{FH} + (N_{AS}-1)(1-G_{AS})G_{FH},$$

where N is a total duration associated with the one or more SRSs, R is a repetition factor associated with the one or more SRSs, $N_{AS}$ is a number of antenna switches associated with the one or more SRSs, $N_{FH}$ is a number of frequency hops with a same antenna or antenna pair associated with the one or more SRSs, $G_{AS} \in \{0, 1\}$ is a guard symbol configuration value for antenna switching, and $G_{FH} \in \{0, 1\}$ is a guard symbol configuration value for frequency hopping of the one or more SRSs; and transmitting a first set of SRSs of the one or more SRSs according to the first SRS frequency hopping pattern and transmitting a second set of SRSs of the one or more SRSs according to the second SRS frequency hopping pattern.

26. A method, performed by a base station (BS), for wireless communication, comprising:

receiving a first set of SRSs of one or more SRSs in a subframe according to a first SRS frequency hopping pattern; and receiving a second set of SRSs of one or more SRSs in the subframe according to a second SRS frequency hopping pattern, wherein:

the second SRS frequency hopping pattern is generated from the first SRS frequency hopping pattern based on an antenna switch in the subframe; and at least one of the first SRS frequency hopping pattern or the second SRS frequency hopping pattern is determined according to:

$$N = R N_{AS} N_{FH} + (N_{AS} - 1) G_{AS} + (N_{FH} - 1) N_{AS} G_{FH} + (N_{AS} - 1)(1 - G_{AS}) G_{FH}$$

where N is a total duration associated with the one or more SRSs, R is a repetition factor associated with the one or more SRSs, NAS is a number of antenna switches associated with the one or more SRSs, NFH is a number of frequency hops with a same antenna or antenna pair associated with the one or more SRSs, GAS E {0, 1} is a guard symbol configuration value for antenna switching, and GFH E {0, 1} is a guard symbol configuration value for frequency hopping of the one or more SRSs.

* * * * *